United States Patent [19]

Huang et al.

[11] Patent Number: 5,683,957
[45] Date of Patent: Nov. 4, 1997

[54] FILM FORMING COMPOSITION EFFECTIVE FOR PROMOTING SEED GERMINATION AND CONTROLLING SEED MIGRATION

[75] Inventors: Emil A. Huang, Fridley; Peter C. Lytle, Wayzata, both of Minn.

[73] Assignee: IntAgra, Inc., Minneapolis, Minn.

[21] Appl. No.: 721,475

[22] Filed: Sep. 27, 1996

Related U.S. Application Data

[63] Continuation of Ser. No. 350,955, Dec. 7, 1994, abandoned.

[51] Int. Cl.$^6$ .............................. A01N 25/00; A01N 25/26
[52] U.S. Cl. .......................... 504/100; 504/101; 504/116; 71/DIG. 1; 47/DIG. 9; 47/DIG. 10
[58] Field of Search .......................... 504/100, 101, 504/116; 71/DIG. 1, 64.13; 405/264; 47/DIG. 10, DIG. 9

[56] References Cited

U.S. PATENT DOCUMENTS

| | | | |
|---|---|---|---|
| 2,957,834 | 10/1960 | Möller et al. | 260/170.2 |
| 3,911,183 | 10/1975 | Hinkes | 428/15 |
| 4,045,204 | 8/1977 | Matsunaga et al. | 71/11 |
| 4,911,952 | 3/1990 | Doane et al. | 427/213.31 |
| 5,125,770 | 6/1992 | Hesseling et al. | 405/263 |
| 5,130,290 | 7/1992 | Tanimoto | 503/201 |
| 5,185,024 | 2/1993 | Siemer et al. | 504/116 |

*Primary Examiner*—S. Mark Clardy
*Attorney, Agent, or Firm*—Michael S. Sherrill

[57] ABSTRACT

An inexpensive composition effective for forming a long lasting, erosion controlling, germination promoting, pliable film over bare soil. The composition may be formulated in dry or liquid form and applied as either a dry powder or liquid dispersion. The composition includes at least a major proportion of gelatinized starch and a plasticizer. The composition may further include a fungicide, a bactericide, a micronutrient, and a filler. The liquid form will also include sufficient solvent—typically water—and may further include a thickener and an emulsifier for purposes of controlling settling of the components and maintaining a uniform dispersion.

27 Claims, No Drawings

FILM FORMING COMPOSITION EFFECTIVE FOR PROMOTING SEED GERMINATION AND CONTROLLING SEED MIGRATION

This is a continuation of U.S. patent application Ser. No. 08/350,955, filed Dec. 7, 1994, abandoned.

FIELD OF THE INVENTION

The invention relates to compositions and procedures used to control seed migration and promote seed germination.

BACKGROUND

Erosion of soil from tilled farmland and construction sites is an enormous problem. Erosion washes away valuable top soil and changes the contour of the land by cutting channels into sloped areas and depositing sediment into low-lying areas. Erosion is particularly destructive when it occurs after planting as the planted seeds are washed away with the soil and must be resown at considerable expense.

Because of the enormous financial and environmental cost associated with erosion, considerable research and development effort has been expended in an effort to control erosion. The most difficult aspect of developing a commercially viable erosion control scheme is balancing the need for effective erosion control with the cost of application. Many schemes have been developed, but few have found commercial success due to an inadequate cost/benefit ratio.

Moller (U.S. Pat. No. 2,957,834) discloses that the structure of soil can be temporarily improved by incorporating a gelatinized starch based soil conditioner into the soil.

Milloch (U.S. Pat. No. 3,224,867) discloses that the stability and water retention properties of soil can be temporarily improved by incorporation of a starch phosphate based soil conditioner into the soil.

Hesseling et al. (U.S. Pat. No. 5,125,770) discloses that soil erosion can be limited by applying a dry or liquid mixture of pre-gelatinized starch and a specific surfactant.

While the compositions disclosed by Moller, Milloch and Hesseling et al. are generally effective for controlling erosion, application of the mixtures must be carefully controlled as the nature of the resultant coating subjects the coating to cracking and erosion when the film is too thin while hindering the sprouting of plants when the film is too thick.

Accordingly, a substantial need exists for an effective, low cost system for controlling seed migration effected by soil erosion. Further advantages sought for such systems is the ability to promote the germination of seeds by reducing average germination time, and assisting in the uniform application of seeds over the area to be treated.

SUMMARY

We have discovered an inexpensive composition which is effective for forming a long lasting pliable film over soil which is effective for controlling soil erosion, limiting seed migration, reducing the evaporation of water and other functional components from the soil, and promoting seed germination. The composition may be formulated in dry or liquid form and applied as either a dry powder or liquid dispersion. The liquid form of the composition includes a film forming polymer. The powdered form of the composition includes a synergistic combination of a film forming polymer and a hygroscopic fiber. The compositions may further include plasticizer, fungicide, bactericide, micronutrient, thickener, emulsifier, sugar, fertilizer, water-activated chromogen, and filler.

DETAILED DESCRIPTION OF THE INVENTION INCLUDING A BEST MODE

Definitions

As utilized herein, including the claims, the phrase "cold water swellable starch" includes any starch form capable of swelling when wetted with cold water including starch which has been pre-gelatinized.

As utilized herein, including the claims, the term "fiber" refers to those hygroscopic materials comprised substantially of substances which are not digestible by the human digestive tract. Typical fibers include cellulose, hemicellulose, lignin and pectic material.

As utilized herein, including the claims, the term "starch" includes starches, grain flours, bean flours, individual starch components and modified starch products.

As utilized herein, including the claims, "wt %" is based upon the total weight of the composition, including water and any other liquid carriers, unless otherwise specified.

Composition

Starch

The critical component of the composition is a polymer capable of readily forming a protective weather resistant film over soil. Suitable polymers include water swellable starch and corn protein, both of which are capable of forming a protective film under typical environmental conditions when wetted with water. Starch is the polymer of choice due to its low cost and ready availability.

Starches which are soluble or swellable in cold water (i.e., cold swelling starch) possess the desired film-forming characteristic. Minor amounts of starches which do not contribute to the film-forming characteristic of the composition may also be incorporated in the composition but are not included when calculating the wt % of film-forming starch.

The starch may be derived from any of the typical starch sources including corn, rice, wheat, potatoes, casava, tapioca, maize, beans, etc. The starch may be chemically, enzymatically or physically modified so long as the film-forming characteristic of the starch is not deleteriously affected.

Gelatinization may be effected by the known procedure of simply heating the starch above its gelatinization temperature until the starch granules form a smooth viscous mass.

Generally, a compositional concentration of about 1 to 20 wt % film-forming polymer, based upon the solids content of the composition, is effective for imparting the desired film forming characteristic to the composition. The liquid form of the composition preferably includes about 1 to 10 wt % film-forming polymer, based upon the solids content of the composition. The powdered form of the composition preferably includes about 3 to 20 wt % film-forming polymer, based upon the solids content of the composition.

Liquid compositional concentrations of greater than about 10 wt % film-forming polymer significantly increases the cost of the composition and tends to produce a highly viscose mass which cannot be applied with conventional spray equipment, while a compositional concentration of less than about 1 wt % film forming polymer requires the application of an excessive amount of other components in order to achieve an application level of film forming polymer effective for producing a protective film having the desired properties and characteristics.

Plasticizer

Incorporation of a plasticizer into the composition makes a resultant film formed by the composition soft and pliable rather than hard and brittle. Pliable films formed from compositions which include a plasticizer tend to remain intact and functional longer than films formed from compositions which do not include a plasticizer.

Suitable plasticizers include vegetable oils, such as corn oil; glycols, such as propylene glycol; concentrated sugar syrups, such as high fructose corn syrup; glycerol and sorbitans.

Generally, a compositional concentration of about 10 to 50 wt % plasticizer, based upon the solids content of the composition, is effective for imparting the desired pliability to the composition. Compositional concentrations of greater than about 50 wt % plasticizer significantly increases the cost of the composition without an accompanying increase in performance and begins to interfere with other desired attributes, while compositional concentrations of less than about 10 wt % plasticizer do not provide the desired level of pliability. Generally, a starch to plasticizer ratio of about 1:2 to 1:5 is effective from providing the desired film pliability without interfering with the other desired attributes of the composition.

Preservative

A preservative may be incorporated into the composition in order to prevent degradation of the manufactured composition during storage and delay degradation of the applied composition by the various microorganisms present in soil. Of the various independent constituents of the composition, starch is the most susceptible to premature degradation and therefore is of foremost concern when selecting a preservative. While the liquid form of the composition is most susceptible to degradation, preservatives can be usefully incorporated into both the liquid and powdered forms of the composition.

The preservative should be fully compatible with the other constituents present in the composition, environmentally friendly, and innocuous to germination and growth of a broad spectrum of seeds. Substantially any of the well known broad spectrum preservatives for starch products may be employed in the present invention including chlorine, chlorine salts, hypochlorides, zinc chloride, chlorinated phenols, benzoyl peroxide, hydrogen peroxide, calcium peroxide, alcohol, copper sulphate, and various antibiotics.

The concentration of preservative necessary to achieve effective preservation of the composition during storage and application depends significantly upon the specific type or types of preservatives used, but generally requires a compositional concentration of about 10 to 200 ppm preservative.

Fungicide

The composition preferably includes an environmentally friendly fungicide capable of controlling fungal growth in the composition during storage. Suitable fungicides include potassium sorbate, sodium benzoate, propylene oxide, diethyl pyrocarbonate, benzoic acid, dihydroacetic acid, propionic acid, sodium nitrate, propylene glycol, copper naphthalate, pentachlorophenol, phenyl mercurial compounds, oxyquinoline sulfate, etc.

Bactericide

The composition also preferably includes an environmentally friendly bactericide effective for controlling the growth of bacteria in the composition during storage such as those listed previously as preservatives.

Micronutrient

The composition may optionally include a source of available micronutrient for promoting growth of sown seeds. The trace minerals typically required for healthy growth and development of plants include aluminum, barium, boron, cadmium, calcium, cobalt, copper, iron, magnesium, manganese, molybdenum, phosphorus, potassium, silicon, sodium, sulfur, titanium, and Zinc. A liquid extract of leonardite clay is known to contain appreciable quantities of these trace minerals and is available from Material Science Co. of Santa Barbara, Calif. under the trademark HUMA-BLEND B. The trace minerals present in the leonardire extract are naturally chelated and readily available for assimilation and use by plants.

Generally, a compositional concentration of at least about 50 ppm micronutrient, based upon the micronutrient content of the micronutrient source and the solids content of the composition, provides an effective growth stimulating concentration of micronutrient. Compositional concentrations of less than about 50 ppm micronutrient simply does not provide an effective growth stimulating concentration of trace minerals.

Fertilizer

The composition may optionally include a fertilizer for promoting rapid and healthy growth of the germinated seeds. The fertilizer may be any of the commercially available slow release types which have been formulated for use with newly sown seeds.

Generally, a compositional concentration of up to about 15 wt %, based upon the solids content of the composition, slow release fertilizer provides an effective growth stimulating concentration of phosphorous, potassium and nitrogen. Compositional concentrations of greater than about 15 wt % fertilizer tend to retard seed germination.

Thickener

A thickener can be incorporated into the liquid form of the composition for controlling settling of the individual constituents and assisting in maintenance of the desired emulsion. We have surprisingly discovered that the presence of a thickener in the composition also tends to improve the physical stability of the resultant film when the thickener and starch components are finely divided and well blended prior to application. Because of this synergistic film-forming effect, the thickener may be beneficially incorporated into both the liquid and powdered forms of the composition. Suitable thickeners include agar, carboxymethylcellulose, carrageenin, chitin, fucoidan, ghatti, gum arabic, karaya, laminaran, locust bean gum, pectin, psyllium seed, quince seed, alginate, sodium alginate, guar gum and tragacanth. The gums are generally preferred because of their low cost, ready availability and superior ability to enhance the physical characteristics of the resultant film.

Generally, a compositional concentration of about 0.5 to 2 wt % thickener is effective for thickening the liquid sufficiently to prevent settling of components during normal shipping, handling and storage periods. Compositional concentrations of greater than about 2 wt % thickener increases the cost of the composition without an accompanying increase in performance and results in a viscose product which is difficult to use, while compositional concentrations of less than about 0.5 wt % thickener are generally ineffective for maintaining prolonged uniform dispersion of the composition or enhancing the physical characteristics of the resultant film.

Emulsifier

Maintenance of a uniform oil-in-water dispersion (i.e., aqueous vegetable oil emulsion) can be assisted by incorporating a compatible emulsifier in the liquid form of the composition. Substantially any of the well known emulsifiers can be incorporated into the composition so long as they are compatible with the other components. Examples of suitable emulsifiers include specifically, but not exclusively, lecithin, monoglycerides, diglycerides, the family of alkoxylated sorbitan fatty acids sold under the trademark TWEEN™ by ICI Americas Inc., and mixtures thereof. The food grade emulsifiers, such as lecithin, are generally preferred.

Generally, a compositional concentration of about 0.1 to 3 wt % emulsifier is effective to prevent separation of the oil and water phases during normal shipping, handling and storage periods. Compositional concentrations of greater than about 3 wt % emulsifier significantly increase the cost of the composition without an accompanying increase in performance, while compositional concentrations of less than about 0.1 wt % emulsifier are generally ineffective for maintaining prolonged emulsification of the oil within the water.

Sugar

A sugar may be incorporated into both liquid and powdered forms of the composition for purposes of neutralizing the pH of highly acidic soil and providing newly germinated plants with a readily available nutrient source for boosting early growth and development. Suitable sugars include the inexpensive monosaccharides, such as glucose and fructose, and disaccharides, such as sucrose and lactose.

Filler

A compatible filler may added to the composition for purposes of facilitating uniform application of the composition at the desired loading. Preferred fillers are selected from the various inexpensive, biodegradable, hygroscopic organic byproducts available from a number of sources. Suitable byproducts include: vegetable pulp, such as obtained from the processing of sugar beets; fruit pulp and peel, such as obtained from the processing of oranges and grapefruit; and the shells and husks of nuts, berries, grains and beans, such as cashew shells, and the husks from wheat and soybeans. Preferred fillers are fibrous byproducts of the type disclosed in U.S. Pat. No. 2,661,297.

Other types of fillers can also be beneficially employed in the composition including soil, sand, compost, clay, fly ash, saw dust, etc.

Generally, a compositional concentration of up to about 95 wt % filler, based upon the solids content of the composition, may be used. Compositional concentrations of greater than about 95 wt % filler increase the cost of the composition without an accompanying increase in performance and results in an unacceptable reduction in the concentration of the active components.

Chromogen

A water-activated chromogen may be incorporated into the powdered form of the composition for purposes of facilitating initial watering of the composition after application to the soil. The powdered form of the composition produces the desired protective film when hydrated with the proper amount of water. Excessive water will wash away the composition before the film can be formed while inadequate water prevents the composition from fully hydrating forming a fully integrated film. The water-activated chromogen allows the user to visually establish where sufficient water has been applied (e.g., those areas having spotted coloration required additional water to fully soak the entire surface area of the composition). Suitable chromogens include any of the well known food and dye coloring agents.

While dependent upon the specific type of chromogen employed, a compositional concentration of about 0.1 to 1 wt % water-activated chromogen is generally effective for providing a visually perceptible tint to the composition. Compositional concentrations of greater than about 1 wt % chromogen increase the cost of the composition without an accompanying increase in visual perceptibility of the composition, while compositional concentrations of less than about 0.1 wt % chromogen are generally ineffective for providing a visually perceptible coloration to the moistened composition.

Both the liquid and powdered forms of the composition may be colored with a chromogen which provides the composition with a distinctive, contrasting color prior to application. Such coloration of the composition promotes customer identification of the product and facilitates application of the product by allowing the user to visually establish where the product has been applied.

Method of Manufacture

Diluted Liquid

A dilute liquid form of the composition may be conveniently formulated by (i) mixing the starch with enough cold water to disperse the starch and form a starch concentrate, (ii) adding additional water to the starch concentrate to achieve the desired solids content, (iii) heating the aqueous starch dispersion to a temperature sufficient to gelatinize the starch without boiling the water—typically about 80° to 95° C.—, (iv) cooling the gelatinized starch to less than about 50° C., (v) blending in the various adjuvants of fungicide, bactericide, micronutrient, thickener, emulsifier, and filler until the adjuvants are uniformly dispersed throughout the composition, and (vi) packaging the composition.

Concentrated Liquid

A concentrated liquid form of the composition may be conveniently formulated by (i) mixing the starch with enough cold water to disperse the starch and form a gelatinizable smooth paste, (ii) blending plasticizer into the paste until uniformly dispersed, (iii) heating the plasticized paste to a temperature sufficient to gelatinize the starch—typically about 80° to 95° C.—, (iv) cooling the gelatinized starch to less than about 50° C., (v) blending in the various adjuvants of fungicide, bactericide, micronutrient, thickener, emulsifier, and filler until the adjuvants are uniformly dispersed throughout the composition, and (vi) packaging the composition.

Concentrated Powder

A powered form of the composition may be conveniently formulated using cold water swellable or instant gelling type starch by (i) mixing the starch and plasticizer, (ii) blending in the various adjuvants of fungicide, bactericide, micronutrient, chromogen, sugars, enzymes and filler, and (iii) packaging the composition.

When seeds are to be added to the composition, they are preferably added along with the other adjuvants. Seeds may also be added to the liquid form of the composition but should not be dispersed in the composition until immediately prior to application.

Method of Use

The composition may be used wherever the desired attributes of temporary erosion control and/or promotion of seed germination are desired including, erosion control at construction sites, reclamation of cultivated fields, seeding of construction sites and lawns, etc.

The composition may be applied as a surface coating to soil in dry or liquid form. The dry form is preferred for smaller application areas where the moisture content of the soil is sufficient to hydrate the composition and permit formation of the desired protective film. The dry form may conveniently include any seeds to be sown into the soil. The liquid form is preferred for larger application areas because of its ease of application and those instances where the moisture content of the soil is insufficient to hydrate the composition. The dry form may be applied using any of the readily available broadcast spreaders, such as those commonly used to apply granular fertilizers. The liquid form may readily be applied using typical spray type equipment, such as the spray booms commonly used to apply commercial fertilizers onto cultivated fields. The dry form may also be applied in liquid form by dispersing the power in water just prior to application.

The amount of composition which must be applied per surface area of soil to achieve the desired protective and nurturing effect depends upon the exact formulation of the composition and the nature of the soil. Generally, application of sufficient composition to produce a film about 1/16 to 1/4 inch thick is effective for providing prolonged erosion control and promoting early germination of seeds sown underneath the treated surface.

The composition may be used alone or in conjunction with soil conditioners and stabilizers which have been worked into the soil, such as those disclosed in U.S. Pat. Nos. 2,661,297;

EXPERIMENTAL

Experiment 1
Powdered

A chromogenic, seed-containing powdered form of the composition was produced by blending (i) 36.03 wt % grass seed, (ii) 31.86 wt % Instant Clear Gel™ starch purchased from National Starch and Chemical Company, (iii) 67.27 wt % Hyperfiber™ vegetable fiber purchased from Humanetics Corporation, and (iv) 0.24 wt % of a water-activated green chromogenic mixture of equal parts powdered Food Dye and Color Blue #1 and powdered Food Dye & Color Yellow #5.

Experiment 2
Powdered

A plasticized, soil-based, seed-containing powdered form of the composition was produced by blending (i) 46.88 wt % grass seed, (ii) 3.91 wt % Instant Clear Gel™ starch purchased from National Starch and Chemical Company, (iii) 19.53 wt % Hyperfiber™ vegetable fiber purchased from Humanetics Corporation, (iv) 23.40 wt % potting soil, and (v) 6.25 wt % partially hydrogenated corn oil.

Experiment 3
Powdered

A micronutrient-containing, soil-based, seed-containing powdered form of the composition was produced by blending (i) 5.0 wt % grass seed, (ii) 23.4 wt % Instant Clear Gel starch purchased from National Starch and Chemical Company, (iii) 30.0 wt % Hyperfiber™ vegetable fiber purchased from Humanetics Corporation, (iv) 40.0 wt % wet top soil, (v) 1.5 wt % sucrose, and (vi) 0.01 wt % Stearn's Miracle Grow™ micronutrient source.

Experiment 4
Powdered

A micronutrient-containing, seed-containing powdered form of the composition was produced by blending (i) 5.0 wt % grass seed, (ii) 35.0 wt % Instant Clear Gel™ starch purchased from National Starch and Chemical Company, (iii) 34.9 wt % Hyperfiber™ vegetable fiber purchased from Humanetics Corporation, (iv) 3.0 wt % powdered activated carbon purchased from, (v) 2.0 wt % Aqualon™ mixture of hydrocolloids purchased from Marine Colloid, Inc., (vi) 15.0 wt % XL sweet whey purchased from Land O'Lakes Corporation, (vii) 5.0 wt % sucrose, and (viii) 0.01 wt % Stearn's Miracle Grow™ micronutrient source.

Experiment 5
Powdered

A plasticized, micronutrient-containing, seed-containing powdered form of the composition was produced by blending (i) 5.0 wt % grass seed, (ii) 35.0 wt % Instant Clear Gel™ starch purchased from National Starch and Chemical Company, (iii) 19.9 wt % Hyperfiber™ vegetable fiber purchased from Humanetics Corporation, (iv) 2.0 wt % powdered activated carbon purchased from, (v) 2.0 wt % Aqualon™ mixture of hydrocolloids purchased from Marine Colloid, Inc., (vi) 30.0 wt % partially hydrogenated vegetable oil (vii) 1.0 wt % XL sweet whey purchased from Land O'Lakes Corporation, (viii) 5.0 wt % sucrose, and (ix) 0.01 wt % Stearn's Miracle Grow™ micronutrient source.

Experiment 6
Powdered

A plasticized, micronutrient-containing, soil-based, seed-containing powdered form of the composition was produced by blending (i) 4.76 wt % grass seed, (ii) 29.76 wt % Instant Clear Gel™ starch purchased from National Starch and Chemical Company, (iii) 19.84 wt % Hyperfiber™ vegetable fiber purchased from Humanetics Corporation, (iv) 19.84 wt % dry top soil, (v) 9.92 wt % partially hydrogenated vegetable oil, (vi) 0.99 wt % lecithin purchased from Central Soy, (vii) 11.90 wt % XL sweet whey purchased from Land O'Lakes Corporation, (viii) 2.98 wt % sucrose, and (ix) 4.86 wt % Stearn's Miracle Grow™ micronutrient source.

Experiment 7
Powdered

A chromogenic, seed-containing powdered form of the composition was produced by blending (i) 5.00 wt % grass seed, (ii) 44.85 wt % Instant Clear Gel™ starch purchased from National Starch and Chemical Company, (iii) 45.00 wt % Hyperfiber™ vegetable fiber purchased from Humanetics Corporation, (iv) 5.00 wt % sucrose, (v) 0.10 wt % Stearn's Miracle Grow™ Vegetable and Gardern fertilizer, and (vi) 0.05 wt % of a water-activated green chromogenic mixture of 1 part powdered Food Dye and Color Blue #1 and 4 parts powdered Food Dye & Color Yellow #5.

Experiment 8
Powdered

A chromogenic, plasticized, seed-containing powdered form of the composition was produced by blending (i) 5.00 wt % grass seed, (ii) 45.00 wt % Instant Clear Gel™ starch purchased from National Starch and Chemical Company, (iii) 29.75 wt % Hyperfiber™ vegetable fiber purchased from Humanetics Corporation, (iv) 5.00 wt % sucrose, (v) 15.00 wt % partially hydrogenated vegetable oil, (vi) 0.10 wt % lecithin purchased from Central Soy, (vii) 0.10 wt %

Stearn's Miracle Grow™ Vegetable and Garden fertilizer, and (viii) 0.05 wt % of a water-activated green chromogenic mixture of 1 part powdered Food Dye and Color Blue #1 and 4 parts powdered Food Dye & Color Yellow #5.

Experiment 9
Powdered

A chromogenic, plasticized, seed-containing powdered form of the composition was produced by blending (i) 5.00 wt % grass seed, (ii) 37.70 wt % Instant Clear Gel™ starch purchased from National Starch and Chemical Company, (iii) 37.15 wt % Hyperfiber™ vegetable fiber purchased from Humanetics Corporation, (iv) 5.00 wt % sucrose, (v) 15.00 wt % plasticizer blend containing equal parts propylene glycol and partially hydrogenated vegetable oil, (vi) 0.10 wt % Stearn's Miracle Grow™ Vegetable and Garden fertilizer, and (vii) 0.05 wt % of a water-activated green chromogenic mixture of 1 part powdered Food Dye and Color Blue #1 and 4 parts powdered Food Dye & Color Yellow #5.

Experiment 10
Powdered

A chromogenic, high-fiber-content powdered form of the composition was produced by blending (i) 21.05 wt % Stir'n Spur™ modified food starch purchased from A. E. Staley, (ii) 76.30 wt % course Dietfiber™ corn fiber purchased from Lauroff, Inc., (iii) 2.10 wt % sucrose, (iv) 0.02 wt % Stearn's Miracle Grow™ Vegetable and Garden fertilizer, and (v) 0.52 wt % of a water-activated green chromogenic mixture of 1 part powdered Food Dye and Color Blue #1 and 8 parts powdered Food Dye & Color Yellow #5.

Experiment 11
Powdered

A chromogenic, seed-containing powdered form of the composition was produced by blending (i) 23.70 wt % grass seed, (ii) 8.03 wt % modified corn starch purchased from National Starch, (iii) 67.27 wt % vegetable fiber purchased from Delta Fiber, (iv) 0.08 wt % sucrose, and (v) 0.20 wt % of a water-activated green chromogenic mixture of 2 parts Food Dye and Color Blue #1 and 15 parts Food Dye & Color Yellow #5.

Experiment 12
Liquid

A liquid form of the composition was produced by (i) dispersing 8 grams of locust bean gum purchased from Hercules Chemicals into 500 grams of warm water using a mechanical blender to form a smooth gum slurry, (ii) dispersing 100 grams of unmodified corn starch purchased from A. E. Staley into 500 grams of cold water using a mechanical blender to form a smooth starch slurry, (iii) boiling 2,768 grams of water, (iv) sequentially adding the gum slurry and the starch slurry to the boiled water under constant agitation so as to ensure that the gum and starch are completely dispersed and heated to the starch gelatinizing temperature of 200° F.; (v) allowing the heated slurry to cool to room temperature, and (vi) blending 0.5 grams potassium sorbate, 2.5 grams Dexol Sprout-Up 4-7-5™ fertilizer, and 0.5 grams Sanitize™ BK powder purchased from Ecolab Inc. into the cooled slurry.

Experiment 13
Liquid

A liquid form of the composition was produced by (i) dry blending 0.02 grams potassium sorbate, 0.05 grams Dexol Sprout-Up 4-7-5™ fertilizer, and 0.02 grams Sanitize™ BK powder purchased from Ecolab Inc., to form a dry adjuvant mixture; (ii) dispersing 2 grams of unmodified corn starch purchased from National Starch and Chemical Company and 1 gram Stir'n Spur™, modified food starch purchased from A. E. Staley, into 10 grams of cold water and hand mixing to form a smooth starch slurry; (iii) boiling 90 grams of water; (iv) gradually add the starch slurry to the boiled water under constant agitation so as to ensure that the starch was completely dispersed and heated to the starch gelatinizing temperature of 200° F.; (v) allowing the heated slurry to cool to at less than 150° F.; and (vi) blending the dry adjuvant mixture into the cooled slurry.

Experiment 14
Liquid

A liquid form of the composition was produced by (i) dry blending 0.73 grams potassium sorbate, 0.92 grams Stearn's Miracle Grow™ Vegetable and Garden fertilizer, and 0.40 grams Sanitize™ BK powder purchased from Ecolab Inc. to form a dry adjuvant mixture; (ii) dispersing 74.00 grams of pure unmodified food grade corn starch and 37 gram Stir'n Spur™ modified food starch, both purchased from A. E. Staley, into 500 grams of cold water using a mechanical blender to form a smooth starch slurry; (iii) boiling 3300 grams of water; (iv) gradually adding the starch slurry to the boiling water under constant agitation so as to ensure that the starch was completely dispersed and heated to the starch gelatinizing temperature of 200° F.; (v) allowing the heated slurry to cool to less than 150° F.; and (vi) blending the dry adjuvant mixture into the cooled slurry.

Experiment 15
Liquid

A liquid form of the composition was produced by (i) dispersing 2.56 grams of pure unmodified food grade corn starch purchased from A. E. Staley into 66.25 grams of cold water using a mechanical blender to form a smooth starch slurry; (ii) blending 5.00 grams of sucrose into the starch slurry using the mechanical blender, (iii) dispersing 0.21 grams low methoxy pectin obtained from Hormel into 22.9 grams of water to form a pectin slurry; (iv) boiling the starch slurry so as to gelatinize the starch; (v) blending the pectin slurry into the gelatinized starch slurry using the mechanical blender to form a uniform pectin/starch slurry; (vi) blending 0.1 grams Stearn's Miracle Grow™ micronutrient source, and 0.06 grams Dexol Sprout-Up 4-7-5™ fertilizer into the pectin/starch slurry using the mechanical blender; (vii) pouring the composition into the bottle in which it will be sold, (viii) pouring 5.00 grams of a 30 wt % hydrogen peroxide solution on top of the composition in the bottle, and (ix) immediately capping the bottle.

Experiment 16
Liquid

A liquid form of the composition was produced by (i) dispersing 2.56 grams of pure unmodified food grade corn starch purchased from A. E. Staley into 66.35 grams of cold water using a mechanical blender to form a smooth starch slurry; (ii) blending 5.00 grams of sucrose into the starch slurry using the mechanical blender, (iii) dispersing 0.21 grams of low methoxy pectin obtained from Hormel into 25.8 grams of water to form a pectin slurry; (iv) boiling the starch slurry so as to gelatinize the starch; (v) blending the pectin slurry into the gelatinized starch slurry using the mechanical blender to form a uniform pectin/starch slurry; (vi) blending 0.1 grams Stearn's Miracle Grow™ micronutrient source, 0.06 grams Dexol Sprout-Up 4-7-5™ fertilizer, and 0.1 grams potassium sorbate, into the pectin/starch slurry using the mechanical blender; (vii) pouring the composition into the bottle in which it will be sold, (viii) pouring 5.00 grams of a 30 wt % hydrogen peroxide solution on top of the composition in the bottle, and (ix) immediately capping the bottle.

Experiment 17

Liquid

A liquid form of the composition was produced by (i) dispersing 2.56 grams of pure unmodified food grade corn starch purchased from A. E. Staley into 66.35 grams of cold water using a mechanical blender to form a smooth starch slurry; (ii) blending 5.00 grams of sucrose into the starch slurry using the mechanical blender, (iii) dispersing 0.21 grams of low methoxy pectin obtained from Hormel into 25.8 grams of water to form a pectin slurry; (iv) boiling the starch slurry so as to gelatinize the starch; (v) allowing the heated slurry to cool to less than 150° F., (vi) blending the pectin slurry into the cooled gelatinized starch slurry using the mechanical blender to form a uniform pectin/starch slurry; (vii) blending 0.1 grams Stearn's Miracle Grow™ micronutrient source, 0.06 grams Dexol Sprout-Up 4-7-5™ fertilizer, and 0.1 grams potassium sorbate into the pectin/ starch slurry using the mechanical blender to form an aqueous phase; (viii) dissolving 2 grams of lecithin purchased from Central Soy into 18 grams of vegetable oil to forman emulsifier-containing oil phase; (ix) blending the water and oil phases together in a single stage homogenization process using a Gaulin homogenizer at 1500 to 2000 psi; (x) pouring the blended composition into the bottle in which it will be sold, (xi) pouring 5.00 grams of a 30 wt % hydrogen peroxide solution on top of the composition in the bottle; and (xii) immediately capping the bottle.

Experiment 18

Liquid

A liquid form of the composition was produced by (i) dispersing 2.56 grams of pure unmodified food grade corn starch purchased from A. E. Staley into 56.35 grams of cold water using a mechanical blender to form a smooth starch slurry; (ii) blending 5.00 grams of sucrose into the starch slurry using the mechanical blender, (iii) dispersing 0.21 grams of low methoxy pectin obtained from Hormel into 25.8 grams of water to form a pectin slurry; (iv) boiling the starch slurry so as to gelatinize the starch; (v) blending the pectin slurry into the gelatinized starch slurry using the mechanical blender to form a uniform pectin/starch slurry; (vi) blending 0.1 grams Stearn's Miracle Grow™ micronutrient source, 0.06 grams Dexol Sprout-Up 4-7-5™ fertilizer, and 0.3 grams potassium sorbate, into the pectin/ starch slurry using the mechanical blender to forman aqueous slurry; (vii) blending 10 grams of propylene glycol into the aqueous slurry under constant agitation; (viii) pouring the blended composition into the bottle in which it will be sold, (ix) pouring 5.00 grams of a 30 wt % hydrogen peroxide solution on top of the composition in the bottle; and (x) immediately capping the bottle.

Experiment 19

Performance

Nine outdoor test plots aggregating approximately 1060 ft$^2$ were hand sown with the seed formulations set forth below in TABLE ONE. The AGROTEC formulations were manufactured in accordance with the procedure set forth in Experiment ™11. The test plots were watered daily. The relative times of initial germination and uniformity of seed distribution were identified by visual inspection and recorded. All of the test plots planted with the AGROTEC formulations were observed to germinate one to two days earlier and exhibit a more uniform distribution of grass throughout the test plot relative to the CONTROL plot and plots sown with Scott's Patch Master™ grass seed.

TABLE ONE

| Plot # | Product | Seed/Coat (oz/oz) | COATING FORMULATION (wt %) | | | | | |
|---|---|---|---|---|---|---|---|---|
| | | | Starch | Fiber | Sugar | Blue | Yellow | Fertilize |
| CONTROL | | −/9.6 | | | | | | |
| 1 | SCOTTS | | | | | | | |
| 2 | SCOTTS | | | | | | | |
| 3 | SCOTTS | | | | | | | |
| 4 | AGROTEC | 22/9.6 | 10.53 | 88.16 | 1.05 | 0.03 | 0.23 | 0.01 |
| 5 | AGROTEC | 30/9.6 | 7.02 | 92.11 | 0.70 | 0.02 | 0.15 | 0.01 |
| 6 | AGROTEC | 45/9.6 | 20.06 | 76.30 | 2.10 | 0.06 | 0.46 | 0.02 |
| 7 | AGROTEC | 30/9.6 | 20.06 | 76.30 | 2.10 | 0.06 | 0.46 | 0.02 |
| 8 | AGROTEC | 45/9.6 | 20.06 | 76.30 | 2.10 | 0.06 | 0.46 | 0.02 |

Starch = Instant Gel ™ modified corn starch purchased from National Starch.
Fiber = Vegetable fiber purchased from Lauroff.
Sugar = Sucrose
Blue = Food Dye and Color Blue #1
Yellow = Food Dye & Color Yellow #5.
Fertilize = Stearn's Miracle Grow ™ Vegetable and Garden fertilizer.

We claim:

1. An agrochemical composition comprising:
   (a) an unactivated water-activated film-forming polymer;
   (b) seeds; and
   (c) an unactivated water-activated chromagen effective for tinting the composition when contacted with water; whereby activation of the polymer is visually indicated by the chromagen.

2. The composition of claim 1, wherein the film-forming polymer is a cold water swellable starch.

3. The composition of claim 2 wherein the starch is derived from a starch source selected from the group consisting of corn and potatoes.

4. The composition of claim 1 wherein the seeds are grass seeds.

5. The composition of claim 2 wherein the composition comprises about 3 to 20 wt % starch and about 10 to 20 wt % seeds.

6. The composition of claim 1 wherein the composition further includes a filler.

7. The composition of claim 6 wherein the filler is a hygroscopic organic fibrous byproduct.

8. The composition of claim 1 further comprising a plasticizer.

9. The composition of claim 6 wherein the plasticizer is selected from the group consisting of propylene glycol and vegetable oil.

10. The composition of claim 1 further comprising an amount of a fungicide effective for controlling fungal growth in the composition.

11. The composition of claim 1 further comprising an amount of a bactericide effective for controlling microbial growth in the composition.

12. The composition of claim 1 further comprising a growth promoting amount of a micronutrient.

13. The composition of claim 1 further comprising a growth promoting amount of a slow release fertilizer.

14. An agrochemical dry particulate composition, comprising:
   (a) about 3 to 20 wt % unactivated water swellable starch;
   (b) about 10 to 20 wt % seeds;
   (c) about 0 to 50 wt % plasticizer;
   (d) about 10 to 50 wt % filler; and
   (e) an amount of an unactivated water-activated chromagen effective for tinting the composition when contacted with water, whereby activation of the polymer is visually indicated by the chromagen.

15. A composition comprising:
   (a) an unactivated water-activated film-forming polymer; and
   (b) an unactivated water-activated chromagen effective for tinting the composition when contacted with water; whereby, activation of the polymer is visually indicated by the chromagen.

16. The composition of claim 15 wherein the film-forming polymer is a cold water swellable starch.

17. The composition of claim 15 wherein the composition further includes a filler.

18. The composition of claim 17 wherein the filler is a hygroscopic organic fibrous byproduct.

19. The composition of claim 15 further comprising an amount of a fungicide effective for controlling fungal growth in the composition.

20. The composition of claim 15 further comprising an amount of a bactericide effective for controlling microbial growth in the composition.

21. The composition of claim 15 further comprising a growth promoting amount of a micronutrient.

22. The composition of claim 15 further comprising a growth promoting amount of a slow release fertilizer.

23. A dry particulate composition, comprising:
   (a) about 3 to 20 wt % unactivated water swellable starch;
   (b) about 0 to 50 wt % plasticizer;
   (c) about 10 to 50 wt % filler; and
   (d) an amount of an unactivated water-activated chromagen effective for tinting the composition when contacted with water, whereby activation of the polymer is visually indicated by the chromagen.

24. A method of protectively sowing seeds comprising (i) spreading the composition of claim 1 over an area, and (ii) applying water to any of the spread composition which has not changed color.

25. The method of claim 24 wherein the composition is spread in an amount effective for forming a substantially continuous $1/16$ to $1/4$ inch thick film over the area.

26. A method of protecting sown seeds comprising (i) distribution of seeds over an area, (ii) application of the film-forming composition of claim 15 over the area, and (iii) applying water to any of the applied composition which has not changed color.

27. The method of claim 26 wherein the composition is applied in an amount effective for forming a substantially continuous $1/16$ to $1/4$ inch thick film over the area.

* * * * *

UNITED STATES PATENT AND TRADEMARK OFFICE
CERTIFICATE OF CORRECTION

PATENT NO. : 5,683,957

DATED : November 4, 1997

INVENTOR(S) : Huang et al.

It is certified that error appears in the above-identified patent and that said Letters Patent is hereby corrected as shown below:

Column 4, Line 11, "Zinc" should be -- zinc --
Column 7, Line 40, "Nos." should be -- No. --
Column 7, Line 40, ";" should be -- . --
Column 7, Line 66, "Gel" should be -- Gel™ --
Column 8, Line 29, "oil" should be -- oil, --
Column 10, Line 7, "to at less than" should be -- to less than --
Column 12, Line 10, "TM" should be -- # --

Signed and Sealed this

Twenty-fourth Day of March, 1998

Attest:

BRUCE LEHMAN

*Attesting Officer*  *Commissioner of Patents and Trademarks*